United States Patent [19]

Meissner

[11] 4,171,042
[45] Oct. 16, 1979

[54] FRUIT POSITIONING APPARATUS

[75] Inventor: Konrad E. Meissner, Lafayette, Calif.

[73] Assignee: California Processing Machinery, San Ramon, Calif.

[21] Appl. No.: 849,261

[22] Filed: Nov. 7, 1977

[51] Int. Cl.² .................... B65G 47/24; B65G 47/40
[52] U.S. Cl. .................................. 198/386; 198/494; 198/706; 198/800
[58] Field of Search ............... 198/384, 385, 386, 387, 198/494, 706, 797, 798, 800, 802; 99/550

[56] References Cited
U.S. PATENT DOCUMENTS

| | | | |
|---|---|---|---|
| 2,786,562 | 3/1957 | McClelland | 198/385 |
| 3,118,530 | 1/1964 | Harrer et al. | 198/386 |
| 3,145,826 | 8/1964 | Loveland | 198/385 |
| 3,179,232 | 4/1965 | Rodrigues | 198/386 |

*Primary Examiner*—Robert B. Reeves
*Assistant Examiner*—Jeffrey V. Nase
*Attorney, Agent, or Firm*—Limbach, Limbach & Sutton

[57] ABSTRACT

Apparatus is disclosed for positioning fruit of the drupe type in which the fruit is conveyed along a vertically elongated path from a receiving station upward along the path and then downward along the path to a discharge station with the positioning apparatus being operative to urge the fruit to a predetermined orientation during both the upward and downward portions of travel from the receiving station to the discharge station.

6 Claims, 13 Drawing Figures

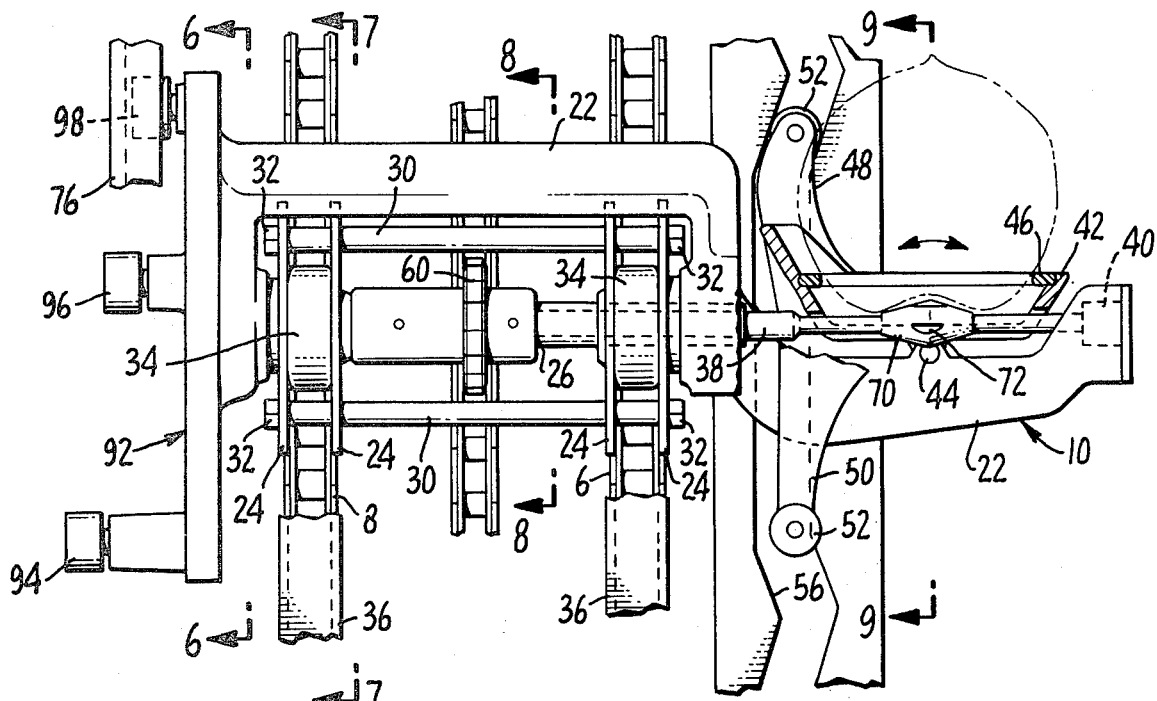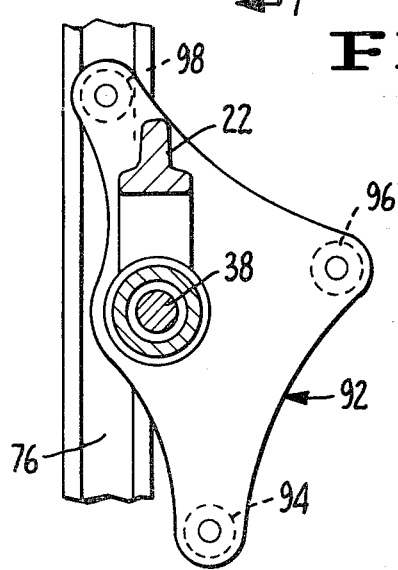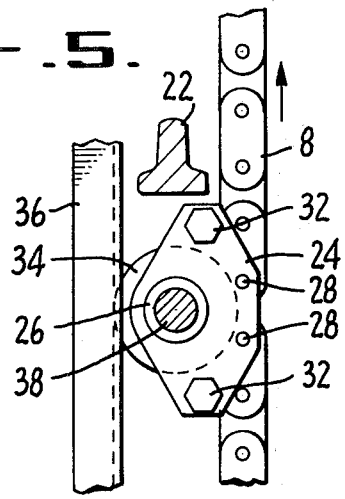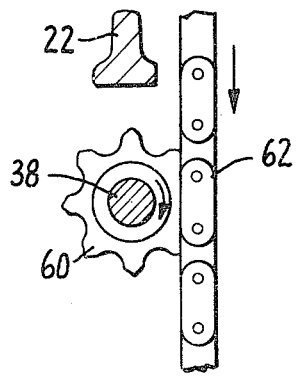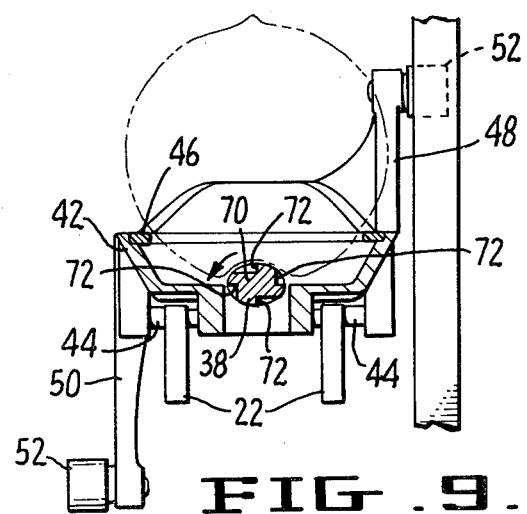

FRUIT POSITIONING APPARATUS

BACKGROUND OF THE INVENTION

In fruit processing plants the trend has long been toward mechanization of as many steps in the processing as possible, particularly in the cutting and pitting of fruit. Fruits of the drupe type and having a clearly defined suture or seam, such as peaches and apricots, have long been halved and pitted by machines with varying degrees of success. In general, these machines grip the fruit which has been aligned with its seam extending in a predetermined direction, into a cutting blade which cuts generally along the seam and grips the pit such that the fruit halves may be twisted free of the pit. However, for such pitting machines to operate satisfactorily, it is necessary that the fruit be aligned such that the blade will engage the fruit generally along the suture. Any other orientation generally results in damage to the fruit and unsatisfactory operation of the pitting function. Exemplary of prior art fruit aligning apparatus is that disclosed in McClelland U.S. Pat. No. 2,786,562. Such prior art apparatus, while functioning satisfactorily in certain applications, has suffered from various disadvantages. For example, the McClelland apparatus conveys the fruit both upwardly and downwardly along a predetermined path but is capable of performing its aligning function only during the downward travel. To obtain consistently proper alignment, it is necessary to apply the aligning motions and forces to the conveyed fruit for a certain minimum period of time and thus along a certain minimum length of the conveyor travel. Such construction as that of McClelland has thus necessarily required a long downward travel and thus a very tall structure, which not only renders maintenance difficult but also requires a substantial vertical clearance in any area where such machine is to be used, thus rendering certain installations difficult.

SUMMARY OF THE INVENTION

In view of the disadvantages and inconveniences of prior art it is an object of the present invention to provide apparatus for aligning and positioning fruit of the drupe type which is both relatively compact and efficient in positioning such fruit in a desired alignment. It is another object of this invention to provide such apparatus for conveying fruit from a receiving station to a discharge station which is effective to urge the fruit toward the predetermined alignment during generally the entire travel from the receiving station to the discharge station. It is yet another object of the invention to provide such apparatus which is easily maintained and serviced.

To achieve the foregoing as well as other objects which will become apparent to those skilled in the art, fruit positioning apparatus is disclosed which includes a support frame, conveying means mounted on the support frame and traveling in a continuous, vertically elongated path, continuously up one portion of the path and then down the opposite portion, a plurality of fruit holding cups mounted on and spaced along the conveying means for receiving the fruit from a receiving station during the upward portion of the travel and carrying the fruit to a discharge station located on the downward travel portion of the conveying path, means for maintaining each fruit holding cup facing upwardly during the entire portion of travel from the receiving station to the discharge station, means operatively connected to each fruit holding cup for orienting the fruit in a predetermined direction with respect to the cup, and means for inverting each fruit holding cup during a portion of its travel from the discharge station to the receiving station. The orienting means are operative to urge the fruit held in the cup to the desired orientation during both the upward portion and the downward portion of travel of the fruit from the receiving station to the discharge station.

DESCRIPTION OF THE DRAWINGS

To further illustrate the principles of this invention, a preferred embodiment will be described in detail in which:

FIG. 5 is a fragmentary side elevation in larger scale taken at points 5—5 of FIG. 2;

FIG. 6 is a fragmentary elevational view of one of the guide brackets of FIG. 5, taken along line 6—6 of FIG. 5;

FIG. 7 is a fragmentary elevational view taken along line 7—7 of FIG. 5;

FIG. 8 is a fragmentary elevational view taken along line 8—8 of FIG. 5;

FIG. 9 is a fragmentary elevational view through the fruit holding cup taken along line 9—9 of FIG. 5;

DESCRIPTION OF A PREFERRED EMBODIMENT

Figure 1:
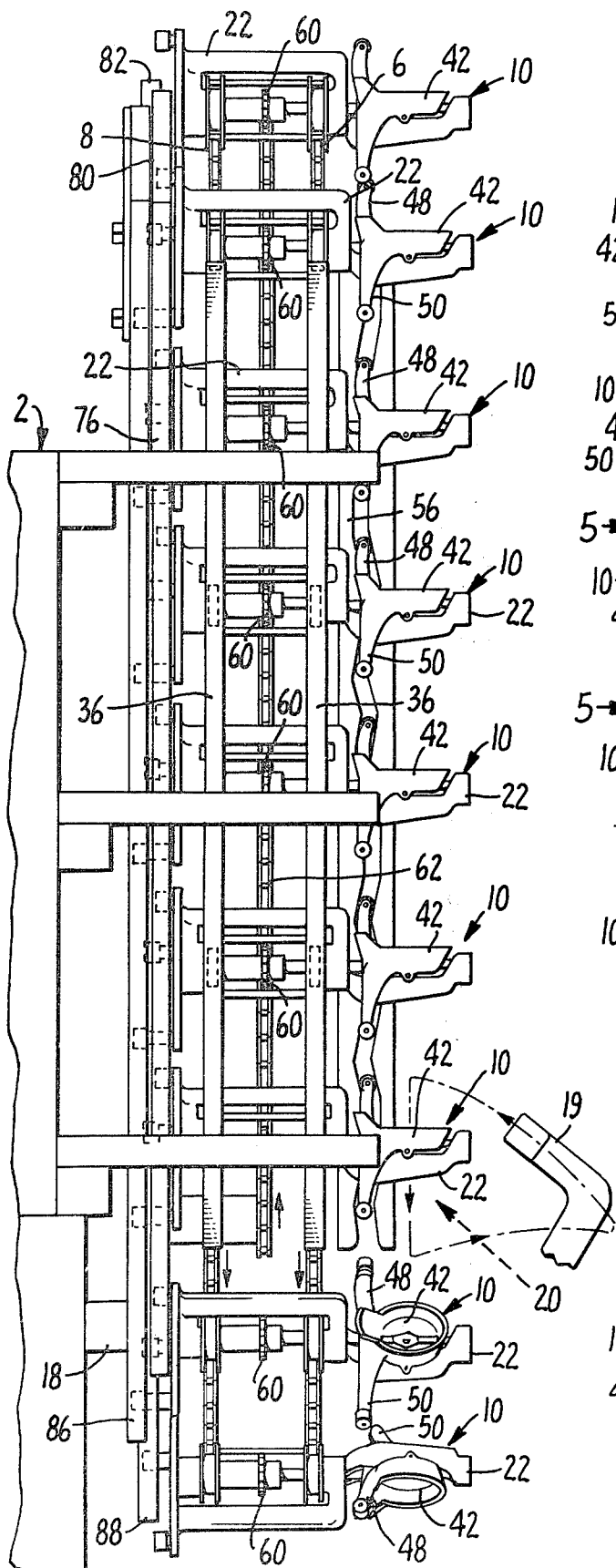
FIG. 1 is a side elevation of the fruit positioning apparatus of this invention.

A particularly preferred embodiment of the fruit positioning apparatus of this invention is illustrated in FIGS. 1-13. The general structure of this apparatus is illustrated in the side and front views of FIGS. 1 and 2 and comprises generally the support frame 2, conveying means 4, suitably in the form of a plurality of driven chains 6 and 8 and a plurality of fruit holding and aligning cup assemblies 10 mounted to the conveyor 4.

Chains 6 and 8 of conveyor 4 are supported adjacent the upper and lower extremities of the positioning apparatus by suitable sprockets 12 and 14 respectively, formed of a suitable metal or rigid synthetic resin, which are mounted upon shafts 16 and 18 and which in turn are journalled to the support frame 2. Lower shaft 18 is rotatably driven by any suitable conventional means, such as an electric motor or by linkage to the associated pitting machine. Preferably the shaft 18 would be driven by a linkage such as a chain to the associated pitting machine in order to synchronize the operation of the aligning or positioning machine with the operation of the pitting machine. Such linkages and driving means are conventional and well known in the art and thus are not illustrated in detail here.

In FIG. 1 is illustrated a portion of the fruit removal arm structure 19 which grasps fruit contained within one of the cup assemblies 10 and removes it from that cup at the point defined as the discharge station 20 on this positioning apparatus. Similarly, in FIG. 2, a portion of a feeder 21 is shown in phantom for feeding the fruit to the cup assemblies 10 at a location in their travel defined as the receiving station. Various types of such feeders 21 are known in the art and are suitable for use with this apparatus for feeding fruit synchronously with the arrival of successive cup assemblies 10 at the receiving station.

The details of the cup carrier assemblies 10 are shown more clearly in the fragmentary views of FIGS. 3-9. This cup carrier assembly comprises generally a carrier 22 which is pivotally attached to connector brackets 24 by means of sleeves 26 which are affixed to the carrier 22 and are journalled in the connector brackets 24. These connector brackets 24 are themselves connected to their respectively adjacent conveyor chains 6 and 8 by rivets 28 (FIG. 7) or other suitable means. For enhanced rigidity the adjacent pairs of connector brackets 24 attached to the chains 6 and 8 are spaced apart from one another by connector shafts 30, into the ends of which may be threaded fasteners 32. A roller 34 preferably is positioned between adjacent connector bracket 24 pairs and journalled for rotation on sleeve 26 for cooperation with the generally vertical guide tracks 36 to guide the cup assemblies 10 during their upward and downward movement around the vertically elongated conveyor path.

Journalled within the mutually aligned sleeves 26 is a shaft 38 which extends outwardly of the outer end of the sleeve 26 which is adjacent conveyor chain 6. The extremity of this outwardly extending portion of shaft 38 is journalled in a bushing 40 mounted in the outermost portion of the carrier 22.

To each carrier 22 a fruit carrier cup 42 is pivotally mounted by means of two shafts 44, shown most clearly in FIG. 9. These shafts 44 permit limited pivotal movement of the cup 42 in the direction indicated by the arrow in FIG. 5, for purposes to be described below. As shown most clearly in FIG. 4, the bottom of each cup 42 is provided with a slot to clear the shaft 38 which extends through the base of that cup 42. This cup 42, along with the carrier 22 and substantially all other parts of the apparatus may be fabricated of suitable metallic materials such as steel, bronze and aluminum. The cup may preferably be cast of a suitable light metal such as aluminum. Adjacent the lip of the cup 42 a ring 46 formed of a low friction plastic, such as Delrin, is provided to reduce frictional engagement between the cup 42 and any fruit carried therewithin.

Figure 4:
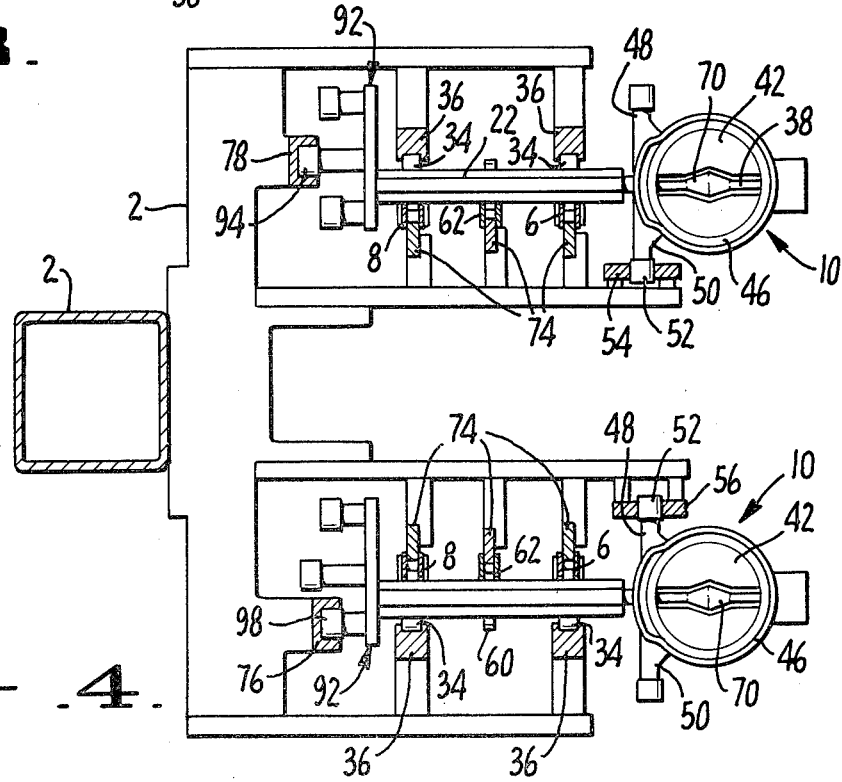
FIG. 4 is a plan sectional view of the apparatus of FIG. 3, taken along line 4—4.

Adjacent the rear of the cup 42 and suitably formed integrally therewith are two cam follower arms 48 and 50, extending, respectively, upwardly and downwardly from the cup. Each of these cam follower arms is provided with a cam following roller 52. As illustrated in FIG. 4, the roller 52 on downwardly extending cam follower arm 50 engages the elongated and undulating two-sided cam track 54 on the left side of the apparatus during the upward travel of the carrier and cup assembly, and the roller 52 on upwardly extending cam follower arm 48 engages the vertically elongated and undulating cam track 56 on the left hand side of the apparatus during the downward travel of the carrier and cup assembly. Engagement between the cam follower rollers and the undulating two-sided cam tracks 54 and 56 effects a rocking motion of the cup 42 about the pivot shafts 44 to assist in moving a fruit around within the cup 42.

Figure 2:
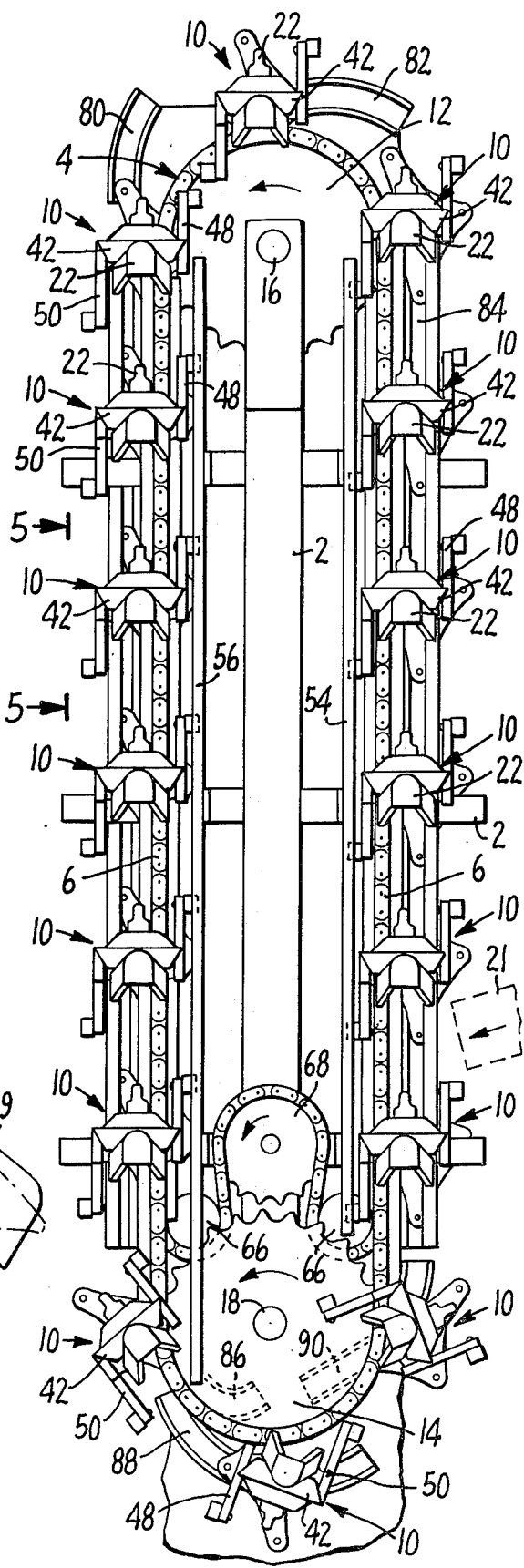
FIG. 2 is a front elevation of the apparatus of FIG. 1.
Figure 3:
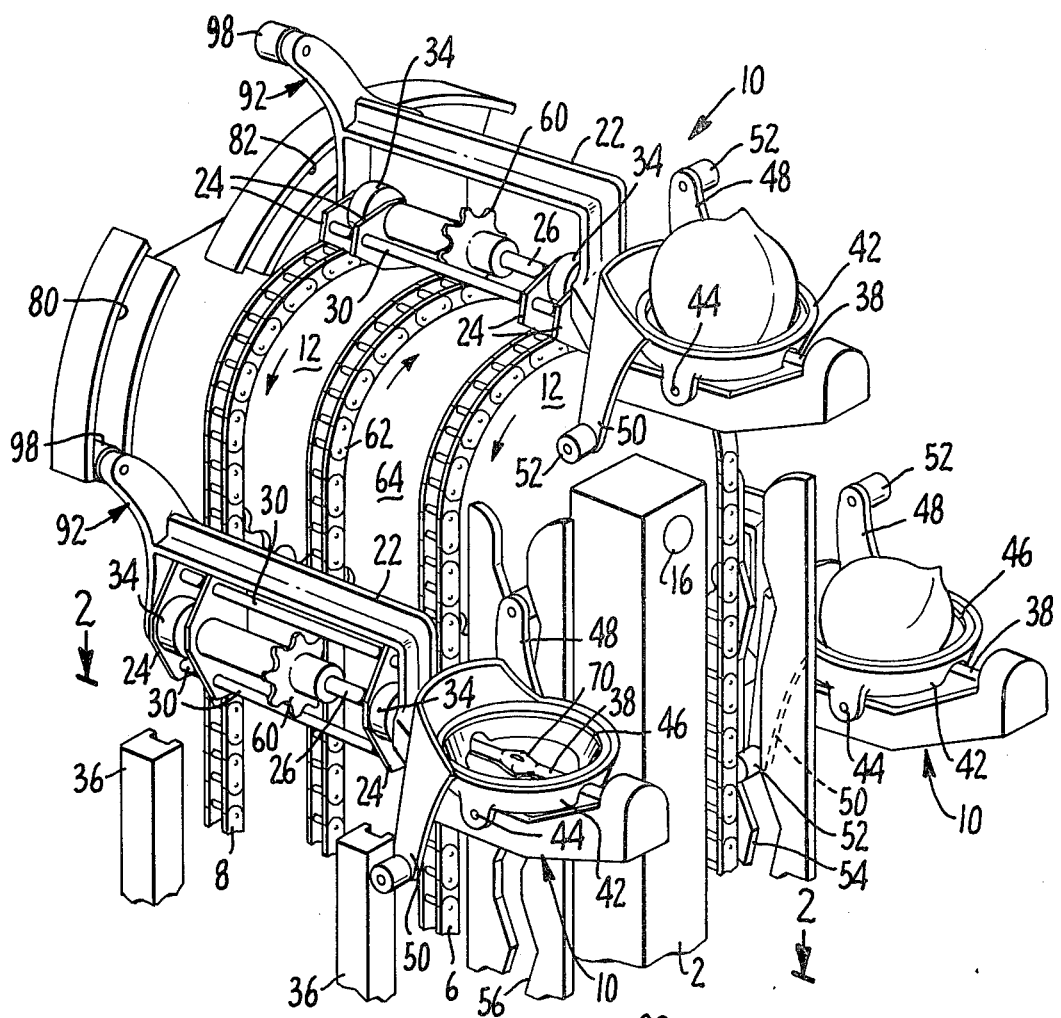
FIG. 3 is a front perspective view of the upper portion of the apparatus of FIGS. 1 and 2.

As shown most clearly in FIGS. 3 and 5, a sprocket 60, suitably of a rigid synthetic resin, is pinned to each shaft 38 for rotation with that shaft. This sprocket 60 engages a middle chain 62 which is supported at the upper extremity of its travel by a sprocket 64 which is mounted coaxially with upper sprockets 12 on shaft 16 and is mounted for free rotation about that shaft 16. Adjacent the lower extremity of its travel, this chain 62 is carried about freely rotating sprockets 66 which are mounted to support frame 2 and illustrated in FIG. 2, and also around drive sprocket 68. This drive sprocket 68 is attached to a shaft which is journalled in the support frame 2 and is driven preferably by the same means driving the lower conveyor sprocket shaft 18. Although the direction of rotation of the sprocket 68 and the lower conveyor sprockets 14 is the same, the looping arrangement illustrated in FIG. 2 provides for movement of the intermediate chain 62 in a direction opposite that of conveyor chains 6 and 8. Thus, as the cup assemblies 10 are carried in one direction by their attachment to conveyor chains 6 and 8, the engagement of the sprocket 60 with the intermediate chains 62 moving in the opposite direction effects a rapid rotation of the sprocket 60 and thus of the shaft 38, for purposes to be described below.

The portion of shaft 38 intermediate the ends thereof and which is generally centered within cup 42 is provided with an enlarged, generally elliptical or oval cross-section, as illustrated in FIGS. 3, 4, 5, and 9. Preferably a plurality of areas of this intermediate portion 70 are removed to form relieved areas 72, for reasons to be described below.

From the top sectional view of FIG. 4 it may be seen that not only are bronze guide tracks 36 provided for cooperation with the plastic rollers 34 on each of the cup carrier assemblies 10, but that also backup chain guides 74, of a rigid synthetic resin or other suitable material, are provided extending adjacent and along the vertical travel of the chains 6, 8 and 62 to prevent any excessive deflection of those chains inwardly of the apparatus.

Since it is desired in the apparatus of this invention to maintain the orientation of the fruit carrying cups 42 continuously upright during the entire portion of their movement from the fruit receiving station to the fruit discharge station, a guide arrangement comprising cam tracks mounted to the support frame 2 and cam follower arrangements forming part of the carrier assemblies 10 is provided, as best shown in the enlarged fragmentary views of FIGS. 10-13. The cam tracks preferably comprise a pair of elongated members 76 and 78 extending generally vertically along the left and right sides of the apparatus respectively. These track pieces 76 and 78 plus the curved upper track pieces 80, 82 and 84 and lower track pieces 86, 88 and 90 may be formed of bronze or other suitable material and are mounted to the support frame 2 in a conventional manner, such as by threaded fasteners.

Figure 10:
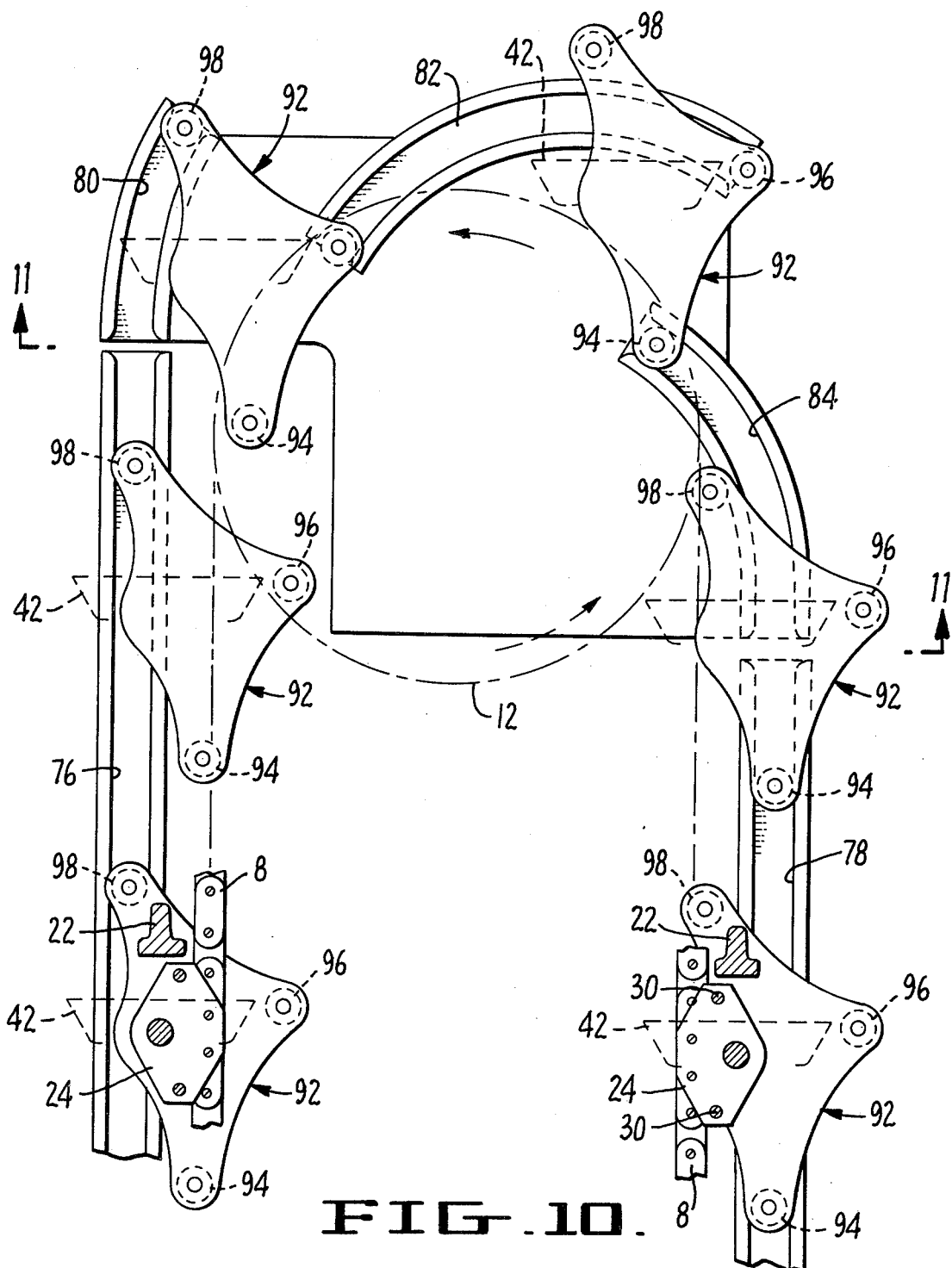
FIG. 10 is a side elevational view of the upper guide track and guide element structure of the apparatus of FIG. 1.
Figure 12:
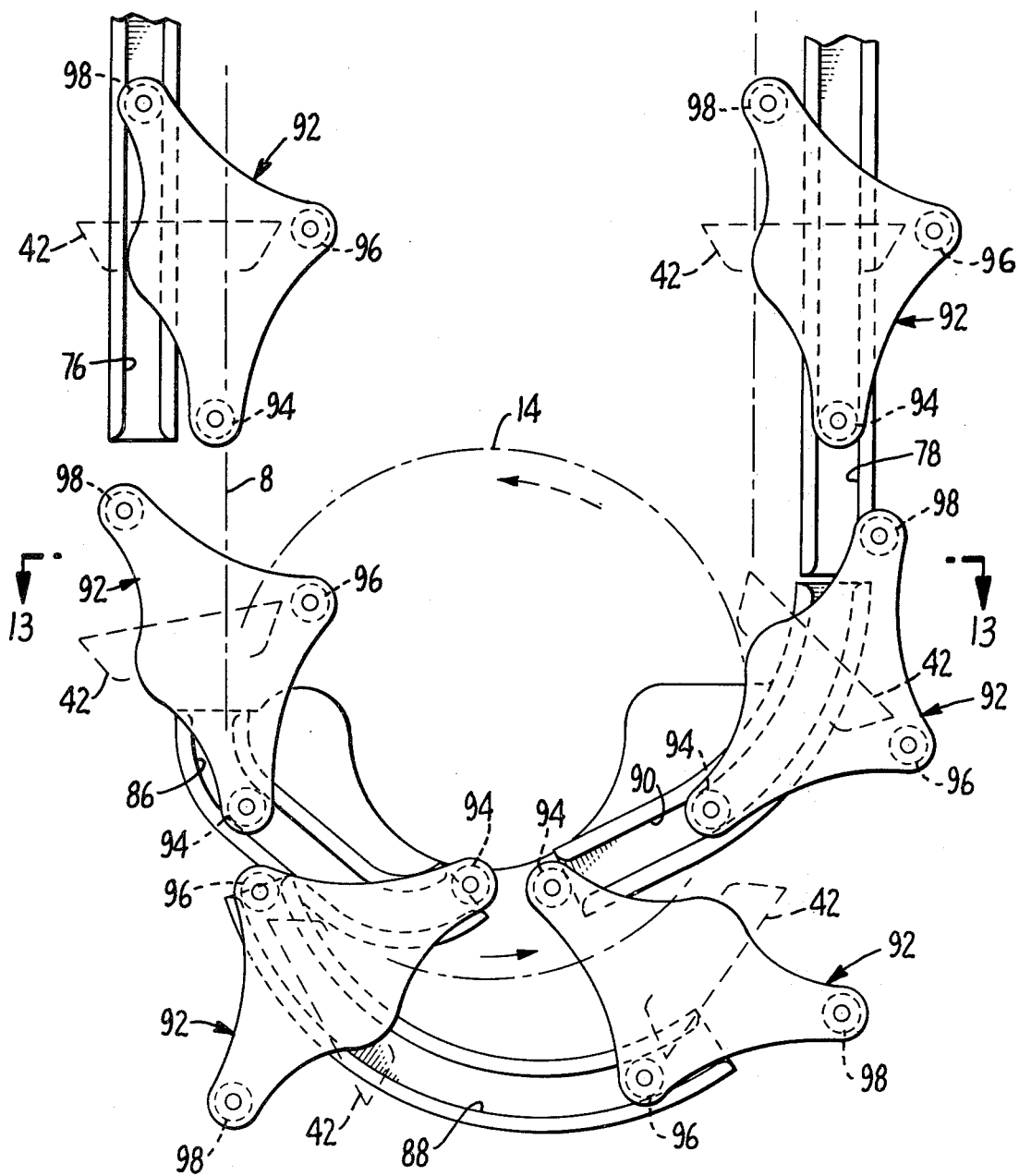
FIG. 12 is a side elevation of the lower guide track and guide member structure of the apparatus of FIG. 1.

Cam assemblies 92 are attached to or, preferably, formed integrally with each cup carrier 22 and are illustrated most clearly in FIGS. 10 and 12. In this preferred embodiment the cam assemblies are of roughly triangular shape and include three cam followers projecting rearwardly of the carrier 22. As illustrated in FIG. 10, each cam assembly 92 includes a lower cam follower roller 94, an intermediate cam follower roller 96 and an upper cam follower roller 98, each positioned in this embodiment at an apex of the roughly triangular cam assembly. The lowermost cam follower 94 is mounted to the assembly 92 in such a manner that it projects substantially farther rearwardly than either the intermediate or upper cam followers 96 and 98. The purpose for this staggered mounting will become apparent below with respect to the operation of the cam following assembly.

FIG. 10 illustrates the relative positions of a plurality of the cup carrier assemblies 10 by illustrating the relative positions of their respective cam assemblies 92. As in FIG. 2, the cup carrier assemblies are moving upwardly on the right hand side of the apparatus and downwardly on the left. As illustrated, the right hand generally vertically extending cam track member 78 is positioned for engagement by lower cam follower 94 during this upward movement, also as illustrated in FIG. 12. As the conveyor chains 6 and 8 and thus the cup carrier assemblies move up and over the upper sprocket 12 of the apparatus (see FIG. 2) the curvature of upper cam track element 84 and its engagement with lower cam follower 94 serves, as illustrated in FIGS. 2 and 10, to maintain the orientation of the cup 42 in an upwardly facing direction until intermediate cam follower 96 engages the uppermost cam track 82. This engagement between cam follower 96 and uppermost cam track portion 82 thus continues to maintain the cup 42 in its upwardly facing orientation as the cup assembly moves over the top of the conveyor path and begins its downward travel to the fruit discharge station 20. As intermediate cam follower 96 reaches the end of the upper cam track portion 82, the upper cam follower element 98 then begins its engagement with the curved cam track portion 80 which leads to the left hand generally vertical cam track portion 76. This upper cam follower 98 then maintains its engagement with the left hand cam track 76 during the entire descent of the cup assembly to the fruit discharge station 20 and then to the lower sprocket 14, thus maintaining the upward facing orientation of the cup 42 during this downward travel.

Figure 11:
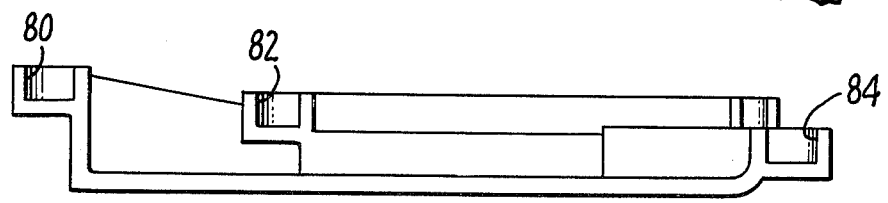
FIG. 11 is a sectional view taken along line 11—11 of FIG. 10.
Figure 13:
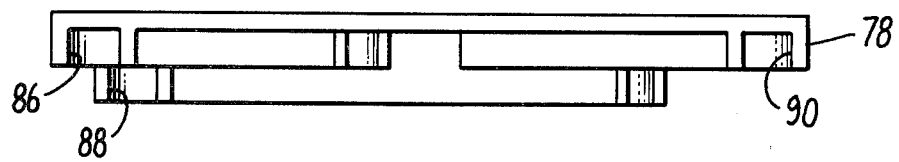
FIG. 13 is a sectional view of the guide track structure of FIG. 12, taken along line 13—13.

After the cup assembly has passed the discharge station 20 where the fruit is removed from the cup, it is desirable to invert the cup in order to dump any undesired matter collecting in the cup prior to the cup reaching the receiving station 21 where it will receive another piece of fruit. The means for inverting the cup in this preferred embodiment of the invention may suitably comprise the lower cam track arrangement illustrated most clearly in FIG. 12. In this structure the upper cam follower 98 of each cam assembly 92 continues to engage the generally vertical left hand cam track 76 until the cup assembly is adjacent the lower drive sprocket 14 which drives the conveyor chains. Prior to the departure of upper cam follower 98 from the lowermost portion of this cam track 76, the lower cam follower 94 enters into the upper portion of the curved cam track 86, which is suitably aligned to receive that cam follower. This cam track 86 is so configured, as illustrated in FIG. 12, that, as the cup carriage assembly and thus the cam assembly 92 is carried further around the bottom of the conveyor path, the cup 42 is tilted and the intermediate cam follower 96 is brought into engagement with the left hand opening of lowermost cam track portion 88 prior to the exit of cam follower 94 from the right hand end of cam track 86. As illustrated in FIGS. 2 and 12 the engagement between the cam followers and these curved cam track portions effects the rapid inversion of the cup to expel any foreign matter which may have collected in the cup 42. Prior to the exit of intermediate cam follower 96 from the right hand end of the lowermost cam track portion 86 during the movement of the cup assembly around the bottom of the conveyor path, cam follower 94 is brought into engagement with the left hand end of curved cam track portion 90. This cam track portion 90 is so configured, as illustrated, that the engagement between cam follower 94 and this cam track portion brings the cup 42 back to its upwardly facing orientation as the cup assembly proceeds further around the conveyor path. The right hand or upper end of this cam track portion 90 desirably is aligned with the lowermost extremity of the generally vertically extending right hand cam track 78, such that the lower cam follower 94 may continue to engage the cam track 78 during the upward movement of the cup assembly first to the receiving station 21 and then upwardly around the track. Thus, the configuration of the various cam track portions and their engagement with the selected cam followers 94, 96 and 98 of each cam assembly 92 maintains the cup in its upwardly facing orientation during its entire travel from the receiving station 21 to the discharge station 20 and then effects an inversion of the cup assembly during its travel from the discharge station 20 back to the receiving station 21. For ease of assembly and alignment the three upper curved cam track portions 80, 82 and 84 suitably may be machined or cast or joined together to form a single unit, as illustrated in FIG. 11. Similarly, it is desirable that the lower cam track portions 86, 88 and 90 likewise be machined, formed or assembled into a single unit, as illustrated in FIG. 13. While a slotted cam track is illustrated as being the guide track with cam followers or rollers comprising the guide elements for each cup assembly, obviously various other types of guide elements and guide tracks may be equally suitable and fully equivalent.

From all the foregoing it may be seen that with the fruit positioning apparatus of this invention, the fruit may be retained in the cups 42 during the entire travel of those cups from the receiving station 21 to the discharge station 20. When a fruit is placed into the cup 42 at receiving station 21, it may be oriented in any direction. For satisfactory operation of the pitting apparatus which is used in conjunction with this positioning apparatus (but which forms no part of this invention), it is necessary that the fruit be oriented with the stem facing downwardly and with a plane defined by the suture of the fruit and extending through the center thereof aligned generally vertically and parallel with shaft 38. To achieve this positioning or alignment, the enlarged portion 70 of the shaft 38 effects a rotation of the fruit until that alignment is reached. Since essentially all portions of a fruit of the drupe type, such as a peach or an apricot, are generally convex except for the concave stem portion, the enlarged portion 70 of shaft 38 will engage the fruit and, by its rotation, rotate the fruit until the enlarged portion is received into the depressed stem area. This rotation is further facilitated by the provision of the low friction plastic ring 46 around the lip of the cup and by the rocking of the cup effected by the engagement of cam follower rollers 52 with the undulating cam tracks 54 and 56, thus rocking the cup about the pivot axis 44. To minimize wear, it is desirable that the respective cam tracks 56 or 54 be engaged by whichever of the cam follower arms 48 or 50 is trailing the direction of movement of the cup assembly 10. Thus, during the upward travel of the assembly the roller 52 on the lower cam follower arm 50 engages undulating cam track 54. Then, during the downward movement of the cup assembly, the upwardly extending cam follower arm 48 engages the undulating cam track 56 to continue to effect the rocking motion. By these various actions, and by the bumping motion imparted to the fruit by the generally eliptical enlarged section 70 of the shaft 38, and with the additional friction provided by the toothlike relieved portions 72 of that shaft, the orientation of the fruit is adjusted until it is brought into the alignment desired for removal at the discharge station 20. Since the fruit receiving cups 42 are maintained continuously in an upright position between the receiving station 23 and the discharge station 20, with the orienting shaft 38 continuously rotating to orient the fruit, the orientation may be effected on both the upward and downward portions of travel, thus substantially shortening the vertical height required for this machine to achieve a desired amount of urging to the proper orientation, as compared with prior art structures which orient only on the downward portion of the travel.

While the foregoing illustrates a particularly preferred embodiment of the apparatus of this invention, it is to be understood that this description is illustrative only of the principles of the invention and is not limitative thereof. Accordingly, since numerous variations and modifications all within the scope of the invention will readily occur to those skilled in the art, the invention is to be limited solely by the claims appended hereto.

What is claimed is:

1. Apparatus for positioning fruit of the drupe type, comprising
    a support frame,
    conveying means mounted on said support frame and traveling in a continuous, vertically elongated path, traveling continuously up one portion of said path and then down the opposite portion,
    a plurality of fruit holding cups mounted upon and spaced along said conveying means for receiving fruit from a receiving station during the upward portion of their travel and carrying said fruit to a discharge station located on the downward travel portion of said conveying path, whereby the fruit received by the cups is carried up the one portion of the path, over the top and then down the other portion to the discharge station for removal,
    means for maintaining each said fruit holding cup facing upwardly during the entire portion of its travel from said receiving station to said discharge station,
    means operatively connected to each said fruit holding cup for orienting said fruit in a predetermined direction with respect to said cup, said orienting means being operative to urge said fruit to said orientation during both said upward portion and said downward portion of travel of said fruit from said receiving station of said discharge station, and
    means for inverting each said fruit holding cup during a portion of its travel from said discharge station to said receiving station, whereby undesired matter remaining in said fruit holding cap after removal of the fruit at the discharge station may be dumped by such inversion.

2. Fruit positioning apparatus according to claim 1 wherein said means maintaining each said cup facing upwardly comprises
    pivotal mounting means mounting said cup to said conveying means and providing for pivotal movement of said cup with respect to said conveying means,
    at least one guide member operatively connected to each said cup, and
    guide track means mounted to said support frame and extending between said receiving station and said discharge station and cooperating with said guide member, whereby the cooperation between the guide track means and the guide member controls the pivotal movement of the cup with respect to the conveying means to maintain the desired orientation of the cup.

3. Fruit positioning apparatus according to claim 2 wherein said cup inverting means comprises additional guide track means mounted to said support frame adjacent the lower end of said conveyor track extending between said discharge station and said receiving station and cooperating with said guide member for restraining the movement of said guide member with respect to the movement of said conveyor means to invert said cup by pivotal movement about said pivotal mounting, whereby the cup may be inverted during its movement from the discharge station to the receiving station to dump any undesired matter remaining in the cup prior to receiving another fruit at the receiving station.

4. Fruit positioning apparatus according to claim 2 wherein said guide member comprises a plurality of guide elements with different ones of said guide elements cooperating with said guide track means at different points of the travel of said cup around said conveyor path.

5. Fruit positioning apparatus according to claim 1 wherein said fruit orienting means comprises, in combination
    means for rocking said cup about an axis, and
    an elongated shaft having a portion intermediate the ends which is of generally elliptical cross-section and having a central axis of rotation extending generally normal to the direction of said rocking axis section extending across the bottom of said cup in a direction generally normal to the direction of said rocking axis such that said rocking brings different portions of the fruit within said cup alternately into and out of contact with said shaft, and
    means for rotating said shaft about its central axis whereby contact by the fruit with the rotating shaft will rotate the fruit within the cup until a portion of the suture of the fruit is aligned to straddle the generally elliptical intermediate portion shaft and thus resist further rotation.

6. A method of orienting fruit of the drupe type into a predetermined position with the stem portion facing downwardly and the suture of the fruit facing in a predetermined direction preparatory to feeding said fruit into a mechanical pit removing machine, comprising the steps of
    placing said fruit into a generally cup-like receptacle at a receiving station,
    conveying said receptacle and said fruit around an inverted U-shaped path having a generally upwardly extending path portion and a generally downwardly extending path portion extending from said receiving station to a discharge station where said fruit is removed from said receptacle, maintaining each cup-like receptable facing generally upwardly during the entire path of travel from said receiving station to said discharge station, applying forces urging said fruit into said predetermined position during said movement of said receptacle and said fruit along both said upwardly extending path portion and said downwardly extending path portion such that said fruit is urged into said predetermined orientation during both said path portions, conveying said receptacle around a generally U-shaped path from said discharge station to said receiving station to receive another for aligning, and inverting said receptacle during said movement from said discharge station to said receiving station, whereby any undesired matter remaining in said receptacle after discharge of the fruit may be dumped from the receptacle.

* * * * *